(12) United States Patent
Kim

(10) Patent No.: US 7,309,730 B2
(45) Date of Patent: Dec. 18, 2007

(54) MODIFIED WEATHERABLE POLYESTER MOLDING COMPOSITION

(76) Inventor: Sung Dug Kim, 234 Avenida de Azaleas, Evansville, IN (US) 47712

( * ) Notice: Subject to any disclaimer, the term of this patent is extended or adjusted under 35 U.S.C. 154(b) by 295 days.

(21) Appl. No.: 11/226,172

(22) Filed: Sep. 14, 2005

(65) Prior Publication Data

US 2006/0030664 A1    Feb. 9, 2006

Related U.S. Application Data

(63) Continuation-in-part of application No. 10/689,239, filed on Oct. 20, 2003, now abandoned.

(51) Int. Cl.
*C08L 69/00* (2006.01)
*C08L 67/02* (2006.01)

(52) U.S. Cl. .................... 524/504; 524/506; 525/67; 525/439; 525/464

(58) Field of Classification Search .................... None
See application file for complete search history.

(56) References Cited

U.S. PATENT DOCUMENTS

| | | | |
|---|---|---|---|
| 2,465,319 A | 3/1949 | Whinfield et al. |
| 3,047,539 A | 7/1962 | Pengilly |
| 3,169,121 A | 2/1965 | Goldberg |
| 3,405,198 A | 10/1968 | Rein et al. |
| 3,769,260 A | 10/1973 | Segal |
| 3,864,428 A | 2/1975 | Nakamura et al. |
| 4,119,607 A | 10/1978 | Gergen et al. |
| 4,155,898 A | 5/1979 | Bopp et al. |
| 4,161,469 A | 7/1979 | LeGrand et al. |
| 4,172,859 A | 10/1979 | Epstein |
| 4,264,487 A | 4/1981 | Fromuth et al. |
| 4,327,764 A | 5/1982 | Biederman et al. |
| 4,364,280 A | 12/1982 | Kutsay |
| 4,487,896 A | 12/1984 | Mark et al. |
| 4,794,141 A | 12/1988 | Paul et al. |
| 5,132,359 A | 7/1992 | Sasaki et al. |
| 5,380,795 A | 1/1995 | Gosens et al. |
| 5,411,999 A | 5/1995 | Gallucci |
| 5,488,086 A | 1/1996 | Umeda et al. |
| 5,981,661 A | 11/1999 | Liao et al. |
| 2003/0191245 A1 | 10/2003 | Nodera et al. |

FOREIGN PATENT DOCUMENTS

| EP | 0709432 | 5/1996 |
|---|---|---|
| EP | 0899306 | 3/1999 |

*Primary Examiner*—David J. Buttner
(74) *Attorney, Agent, or Firm*—Marina Larson & Associates, LLC

(57) ABSTRACT

A composition formed from (a) a polyester and polycarbonate blend; (b) an organopolysiloxane-polycarbonate block copolymer; (c) an acrylic core shell impact modifier; (d) titanium dioxide and (e) a flame retarding amount of a halogenated flame retardant has properties useful as a weatherable molding composition. It can suitably be used in articles such as encloses for electronic equipment such as communication devices.

23 Claims, No Drawings

MODIFIED WEATHERABLE POLYESTER MOLDING COMPOSITION

STATEMENT OF RELATED APPLICATIONS

This application is a continuation in part of U.S. patent application Ser. No. 10/689,239, filed Oct. 20, 2003, now abandoned, which application is incorporated herein by reference.

FIELD OF THE INVENTION

The field is directed to modified thermoplastic resin compositions, and, more particularly, to weatherable and impact modified compositions containing a blend of a polyester resin and a polycarbonate resin that contain titanium dioxide.

BACKGROUND OF THE INVENTION

Moldable thermoplastic polyester crystalline resin blends offer a high degree of surface hardness, solvent resistance and abrasion resistance, high gloss, and low surface friction. However, loss of impact strength when subjected to ultra violet radiation may limit the usefulness of polyester crystalline resin blends for outdoor applications where molded articles made from the polyester will be exposed to sun and hot wet conditions.

Often a rubbery modifier is added to polyesters to improve impact strength. For example, improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Polyblends of polybutylene terephthalate with a styrene-alpha-olefin-styrene triblock are taught in U.S. Pat. No. 4,119,607. U.S. Pat. No. 4,172,859 teaches impact modification of polybutylene terephthalate with random ethylene-acrylate copolymers and EPDM rubbers grafted with a monomeric ester or acid functionality.

Although articles molded from impact-modified polyester resin/polycarbonate resin blends typically provide good impact performance, the weatherability of the such articles may be deficient in some applications where it is desired to retain the impact resistance after long term UV exposure. Hence, it is desirable to provide a molding composition having a combination of flame resistance, impact resistance with enhanced weatherability.

U.S. Pat. No. 4,161,469 describes a polymer blend comprising a polyalkyl terephthalate resin and organosiloxane-polycarbonate block copolymer having improved impact and heat distortion properties. U.S. Pat. No 4,794,141 describes polysiloxane/polycarbonate block copolymers, elastomeric polymers, and polyalkylene terephthalates. The elastomeric polymer is described as a hydrogenated block copolymer of a vinyl aromatic monomer and a conjugated diene. U.S. Pat. No. 5,380,795 describes a polymer mixture comprising an aromatic polycarbonate, a styrene-containing copolymer and/or graft polymer, and a polysiloxane-polycarbonate block copolymer, and articles formed therefrom. However, these patents do not describe flame-retarded blend and do not address question of weatherability of the blends.

U.S. Pat. No. 4,155,898 describes a polymer blend comprising a polyalkylene terephthalate, an organopolysiloxane-polycarbonate block copolymer, and a halogenated copolycarbonate having impact, heat distortion and flame retardant properties.

U.S. Pat. No. 5,981,661 describes a flame retarded molding compositions with enhanced weatherable properties, which comprise a polyester and polycarbonate blend with organopolysiloxane-polycarbonate block copolymer and a glycidyl ester impact modifier. However, high amount of gycidyl impact modifier could cause undesirable viscosity increase through the reaction between glycidy groups in the impact modifier and carboxyl groups in polyesters. In addition, gycidyl impact modifier is less effective impact modifiers than core-shell type rubbers. Accordingly, there is a need for enhancing the impact and processibility, as well as the retention of impact and color upon long term UV exposure. The present invention provides weatherable polyester crystalline resin blends with flame retardant properties for outdoor applications.

SUMMARY OF THE INVENTION

The present invention provides a composition comprising (a) a polyester and polycarbonate blend; (b) an organopolysiloxane-polycarbonate block copolymer; (c) an acrylic core shell impact modifier; (d) titanium dioxide and (e) and a flame retarding amount of a halogenated flame retardant.

According to some embodiments, additional ingredients may include a UV stabilizer, a mineral filler, and other ingredients such as quenchers, flame retardant synergist, and anti-drip additives.

According to an embodiment, a thermoplastic resin comprises polycarbonate, an alkylene aryl polyester, an organopolysiloxane-polycarbonate, and a core-shell impact modifier for enhancing heat resistance having a shell derived from an alkylacrylate and a rubbery acrylate core derived from an acrylate having 4 to 12 carbon atoms and the core may have silicone copolymers.

DETAILED DESCRIPTION OF PREFERRED EMBODIMENTS

The present application provides compositions containing (a) a blend of polyester and polycarbonate; (b) an organopolysiloxane-polycarbonate block copolymer; (c) an acrylic core shell impact modifier; (d) titanium dioxide and (e) a flame retarding amount of a halogenated flame retardant. Experimental evidence presented below establishes that this combination provides desirable properties, including desirable weatherability properties, that are not obtained for other combinations of similar ingredients. Notably, the following were observed:

1. Compositions containing a blend of polyester and polycarbonate, a UV stabilizer, a flame retardant and titanium dioxide, but lacking the organopolysiloxane polycarbonate block copolymer had poor weatherability as reflected by G26 weathering results, regardless of the type of impact modifier employed. (Examples A-G)

2. Compositions containing blend of polyester and polycarbonate, a flame retardant, an acrylic core shell impact modifier, and the organopolysiloxane polycarbonate block copolymer, but lacking the titanium dioxide also had poor weatherability, regardless of whether or not a UV stabilizer as included. (Examples H-J)

3. Compositions containing blend of polyester and polycarbonate, a flame retardant, an acrylic core shell impact modifier, titanium dioxide, and the organopolysiloxane polycarbonate block copolymer, but lacking the UV stabilizer also had poor weatherability.

4. Only compositions that contained all of the specified ingredients exhibited acceptable weatherability performance (Examples 1-7).

5. The present invention with the combination of acrylic impact modifier and organopolysiloxane-polycarbonate block copolymer has better performance than acrylic impact modified polyester compositions shown in prior art in U.S. Pat. No. 4,264,487 (Examples M-N & 7).

6. The present invention with the combination of acrylic impact modifier and organopolysiloxane-polycarbonate block copolymer overcomes shortcoming of the combination of glycidyl ester impact modifier impact modifier and organopolysiloxane-polycarbonate block copolymer shown in prior art in U.S. Pat. No. 5,981,661. Both surface appearance and low temperature impact properties are improved. (Example K-L & 6, Examples M-N & 7).

In one embodiment of the invention a thermoplastic molding composition comprising the following is preferred;
(a) 10-60% polycarbonate
(b) 25-50% polyester such as alkylene terephthalate
(c) 5-15% acrylic core shell impact modifier
(d) 5-50% organopolysiloxane-polycarbonate block copolymer
(e) 5-20% flame retardant and
(f) 0.1 to 10% titanium dioxide, with all percentages being by weight.

In another embodiment of the invention a thermoplastic molding composition comprising the following is preferred;
(a) 25-60% polycarbonate
(b) 25-50% polyester such as alkylene terephthalate
(c) 5-15% acrylic core shell impact modifier
(d) 5-20% organopolysiloxane-polycarbonate block copolymer
(e) 5-20% flame retardant and
(f) 0.1 to 10% titanium dioxide, with all percentages being by weight.

In another embodiment, the composition comprises from 25 to 55 parts by weight, of the polycarbonate resin; from 25 to 55 parts by weight of the polyester resin; from 10 to 20 parts by weight of the organopolysiloxane-polycarbonate block copolymer; and from 2 to 8 parts by weight of the acrylic core shell impact modifier, and 0.1 to 10% titanium dioxide. each based on 100 parts by weight of the blend.

In the compositions of the invention, the individual component ingredients can be further described as follows:

Polycarbonate Resin Component

Aromatic polycarbonate resins suitable for use in the present invention, methods of making polycarbonate resins and the use of polycarbonate resins in thermoplastic molding compounds are well known in the art, see, generally, U.S. Pat. Nos. 3,169,121, 4,487,896 and 5,411,999, the respective disclosures of which are each incorporated herein by reference.

Aromatic polycarbonate resins are, in general, prepared by reacting a dihydric phenol, e.g., 2,2-bis-(4-hydroxyphenyl) propane ("bisphenol A"), 2,2-bis(3,5-dimethyl-4-hydroxyphenyl)propane, bis(2-hydroxyphenyl) methane, 2,6-dihydroxy naphthalene, hydroquinone, 2,4'-dihydroxyphenyl sulfone and 4,4'-dihydroxy-3,3-dichlorophenyl ether, with a carbonate precursor, e.g., carbonyl bromide and carbonyl chloride, a halogen formate, a bishaloformate of a dihydric phenol or a carbonate ester, e.g., diphenyl carbonate, dichlorophenyl carbonate, dinaphthyl carbonate, phenyl tolyl carbonate and ditolyl carbonate.

In a preferred embodiment, the aromatic polycarbonate resin comprises one or more resins selected from linear aromatic polycarbonate resins, branched aromatic polycarbonate resins and poly(ester-carbonate) resins.

Suitable linear aromatic polycarbonates resins include, e.g., bisphenol A polycarbonate resin.

Suitable branched aromatic polycarbonates are made, e.g., by reacting a polyfunctional aromatic compound, e.g., trimellitic anhydride, trimellitic acid, trimesic acid, trihydroxy phenyl ethane or trimellityl trichloride, with a dihydric phenol and a carbonate precursor to form a branching polymer.

Suitable poly(ester-carbonate) copolymers are made, e.g., by reacting a difunctional carboxylic acid, terephthalic acid, isophthalic acid, 2,6-naphthalic acid, or mixtures of acids, or a derivative of a difunctional carboxylic acid, e.g., an acid chloride, with a dihydric phenol and a carbonate precursor.

In a preferred embodiment, the polycarbonate resin has an intrinsic viscosity of about 0.3 to about 1.5 deciliters per gram in methylene chloride at 25° C.

In a preferred embodiment, the polycarbonate resin is a linear polycarbonate resin that is derived from bisphenol A and phosgene. In an alternative preferred embodiment, the polycarbonate resin is a blend of two or more polycarbonate resins.

Suitable aromatic polycarbonate resins are commercially available, e.g., LEXAN™ bisphenol A-type polycarbonate resins from General Electric Company.

Polyester

The term alkylene aryl polyester refers to crystalline thermoplastic polyesters such as polyesters derived from an aliphatic or cycloaliphatic diols, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

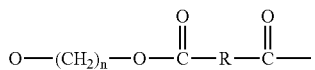

wherein n is an integer of from 2 to 6. R is a $C_6$-$C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4'bisbenzoic acid and mixtures thereof. All of these acids contain at least one aromatic nucleus. Acids containing fused rings can also be present, such as in 1,4-1,5- or 2,6-naphthalenedicarboxylic acids. The preferred dicarboxylic acids are terephthalic acid, isophthalic acid, naphthalene dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") poly(propylene terephthalate) ("PPT") and poly(cyclohexane dimethanol terephthalate), (PCT).

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, or polyester-forming derivatives therefore.

The polyesters used herein have an intrinsic viscosity of from about 0.4 to about 2.0 dl/g as measured in a 60:40 phenol/tetrachloroethane mixture or similar solvent at 23°-30° C. VALOX 315 polyester is particularly suitable for this invention having an intrinsic viscosity of 1.1 to 1.4 dl/g.

A mixture of polyester resins with differing viscosities may be used to make a blend mixture to allow for better control of the viscosity of the final formulation.

Blends of polyesters may also be employed in the composition. As indicated earlier, preferred polyester blends are made from poly(ethylene terephthalate) and poly(1,4-butylene terephthalate).

Acrylic Core Shell Impact Modifier

The composition comprises a core shell impact modifier built up from a rubber-like core on which one or more shells have been grafted. Typical core material consists substantially of an acrylate rubber. Preferable the core is an acrylate rubber of derived from a C4 to C12 acrylate. Typically, one or more shells are grafted on the core. Usually these shells are built up for the greater part from a vinyl aromatic compound and/or a vinyl cyanide and/or an alkyl(meth)acrylate and/or (meth)acrylic acid. Preferable the shell is derived from an alkyl(meth)acrylate, more preferable a methyl(meth)acrylate. The core and/or the shell(s) often comprise multi-functional compounds that may act as a cross-linking agent and/or as a grafting agent. These polymers are usually prepared in several stages. The preparation of core-shell polymers and their use as impact modifiers in combination with polycarbonate are described in U.S. Pat. Nos. 3,864,428 and 4,264,487. Especially preferred grafted polymers are the core-shell polymers available from Rohm & Haas under the trade name PARALOID®, including, for example, PARALOID® EXL3330 and EXL2300.

In another aspect of the invention the acrylic core shell impact modifier comprises a multi-phase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight cross linking member, 0.1 to 5% by weight graft linking monomer, said cross linking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

Preferred impact modifiers include core-shell impact modifiers, such as those having a core of poly(butyl acrylate) and a shell of poly(methyl methacrylate).

In other embodiments suitable impact modifiers comprise those that are core-shell type impact modifiers including shell comprising poly(methyl methacrylate) and core comprising a silicone rubber and at least one poly(alkylacrylate). In a particular embodiment a suitable impact modifier is core-shell type impact modifies including shell comprising poly(methyl methacrylate) and core comprising a silicone rubber and at least one poly(butylacrylate). One type of suitable core-shell impact modifier can be prepared in accordance with the method described in U.S. Pat. No. 5,132,359.

In some embodiments suitable impact modifiers include those sold under the trade name Metablend by Mitsubishi Rayon Co. Ltd.

A useful amount of impact modifier is about 1 to about 30 weight percent, preferably about 5 to about 15 weight percent, more preferably about 6 to about 12 weight percent, wherein the weight percentages are based on the entire weight of the composition.

Core shell acrylic rubbers can be of various particle sizes. The preferred range is from 300-800 nm, however larger particles, or mixtures of small and large particles, may also be used. In some instances, especially where good appearance is required acrylic rubber with a particle size of 350-450 nm may be preferred. In other applications where higher impact is desired acrylic rubber particle sizes of 450-550 nm or 650-750 nm may be employed.

The Polysiloxane-Polycarbonate Block Copolymer

Preferred polysiloxane-polycarbonate block copolymers are set forth in copending application Ser. No. 08/062,485 entitled Polymer blends of Polycarbonate-Polysiloxane block Copolymers with Polycarbonate and Polyestercarbonate Copolymers by Hoover (Our Case 8CL-7015). The blend comprises a polysiloxane from recurring polysiloxane blocks of the formula:

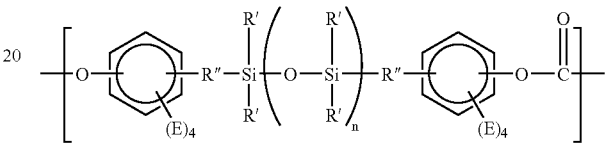

The polycarbonate-block comprises units of the formula:

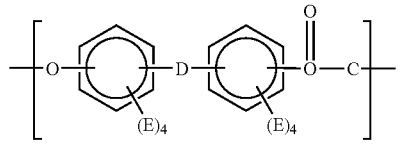

with the preferred polycarbonate-block comprises units of the formula:

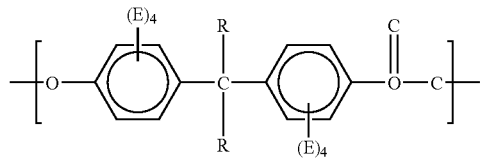

The resulting organopolysiloxane-polycarbonate block copolymer includes organopolysiloxane-polycarbonate blocks having repeating units of the general formula:

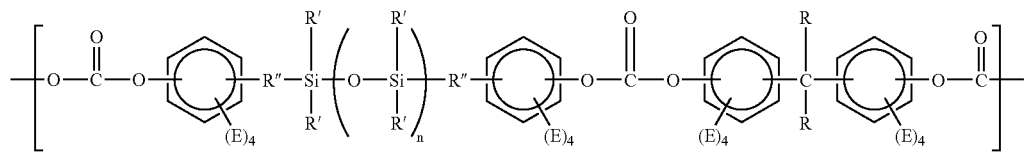

In the above formulae, R' is a member selected from the class of monovalent hydrocarbon radicals, halogenated monovalent hydrocarbon radicals and cyanoalkyl radicals; E is a member independently selected from the class of hydrogen, lower alkyl, alkoxy radicals, aryl, and alkylaryl, halogen radicals and mixtures thereof, preferably hydrogen or alkoxy and when alkoxy, preferably methoxy; R" is a divalent hydrocarbon radical, preferably an alkylene radical of from 1 to 6 carbon atoms with $C_3$ being most preferred, and n is from about 10 to about 120, preferably from about 40 to about 60.

A is a divalent hydrocarbon radical containing from 1-15 carbon atoms; —S—, —SO—, —S(O)$_2$; —O—. Preferably D is a divalent hydrocarbon radial. In the case where A is —C(R)$_2$—, R is a member selected from the class of hydrogen, cycloaliphatic, aryl, monovalent hydrocarbon radicals, aryl or alkyaryl, preferably R is alkyl, preferably C1-C6 alkyl, and more preferably methyl.

Preferred polysiloxane-polycarbonate block copolymers are set forth in copending application Ser. No. 08/062,485, comprise from about 1 to about 50 percent by weight of siloxane. Pages 2-14 of the above mentioned application are incorporated into the present specification by reference. These pages relate to the preferred polycarbonate-polysiloxane blocks of utilized in the present invention. Additional preferred embodiments are set forth in Ser. No. 08/668,445 to Hoover et al entitled Terpolymer Having Aromatic Polyester, Polysiloxane and Polycarbonate Segments, (Our Case 8CL-7001) which pages 3-14 is incorporated into the present specification by reference.

Other illustrative organopolysiloxane block copolymers are set forth in U.S. Pat. No. 4,161,498 to Bopp which describes polysiloxane blocks of the following general formulae:

while R is preferably methyl, R' includes all radicals included by R above except hydrogen, where R' also can be all the same radical or any two or more of the aforementioned R radicals except hydrogen and R' is preferably methyl. R' also includes, in addition to all the radicals included by R, except hydrogen, cyanoalkyl radicals such as cyanoethyl, cyanobutyl, etc. radicals. Radicals that are included within the definition of E are hydrogen, methyl, ethyl, propyl, chloro, bromo, etc. and combinations thereof, and E is preferably hydrogen.

The organopolysiloxane-polycarbonate block copolymers can be made by any technique known to those skilled in the art including the techniques described by Merritt, Merritt, Jr., et al., and Vaughn Jr. in the U.S. patents referenced in the description of the prior art hereinbefore.

Accordingly, all of the procedures described in the aforesaid patents relating to methods for the preparation of the organopolysiloxane-polycarbonate block copolymers are incorporated herein in their entirety by reference.

Illustratively presently preferred organopolysiloxane-polycarbonate block copolymers contain repeating units of above Formula, set out herein before wherein X, Y, Z, a, n and m are as defined hereafter: Resin Type "A"; X equals about 7; Y equals about 8 to 10; Z equals about 1; a equals about 2; n equals about 10; m equals about 1. Resin Type "B"; X equals about 10; Y equals about 8 to 10; Z equals

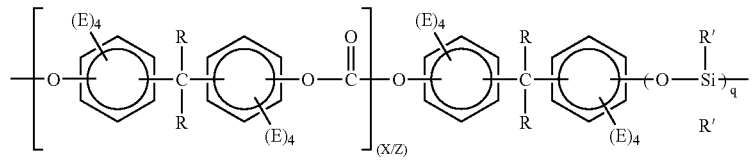

A organopolysiloxane-polycarbonate block copolymer of Bopp is represented by the following formula comprising organopolysiloxane-polycarbonate blocks having repeating units of the general formula:

about 1; a equals about 2; n equals about 20; m equals about 1. Resin Type "C"; X equals about 5; Y equals about 8 to 10; Z equals about 1; a equals about 2; n equals about 20; m equals about 1.

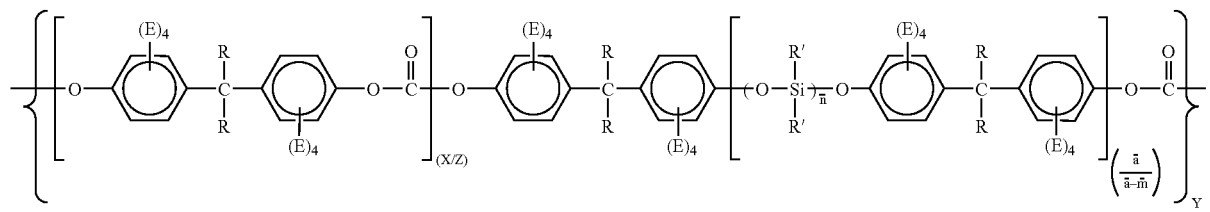

where X is an integer equal to 1 to 1000, inclusive, preferably 2 to 100, Z is equal to 1, n is a number average equal to 1 to 100, inclusive, preferably 5 to 40, a is a number average equal to 1.1 to 100, m is equal to 1, and Z is an integer equal to 1 to 1000, inclusive, preferably 5 to 12. E, R, and R' being as defined hereinafter.

Included within the radicals represented by R aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, cycloalkyl, haloalkyl including methyl, ethyl propyl, chlorobutyl, cyclohexyl, etc.; R can be all the same radical or any two or more of the aforementioned radicals, Flame Retardant Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 2 to 30 percent by weight based on the weight of resin. A preferred range will be from about 8 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega -alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

The flame-retardants are typically used with a synergist, particularly inorganic antimony compounds. Such compounds are widely available or can be made in known ways. Typical, inorganic synergist compounds include $Sb_2O_5$, $SbS_3$, sodium antimonite and the like. Especially preferred is antimony trioxide ($Sb_2O_3$). Synergists, such as antimony oxides, are typically used at about 0.5 to 15 by weight based on the weight percent of resin in the final composition.

Fillers

Additionally, it may be desired to employ inorganic fillers to the thermoplastic resin provided the favorable properties are not deleteriously affected. Typical inorganic fillers include: alumina, amorphous silica, anhydrous alumino silicates, mica, wollastonite, clays, talc, zinc sulfide, ground quartz, and the like. Low levels (0.1-10.0 wt. %) of very small particle size (largest particles less than 10 microns in diameter) are preferred.

Fiber Additives

The polyester resins of the invention may be further blended with reinforcements, fillers and colorants.

Reinforcing fiber and fillers may comprise from about 5 to about 50 weight percent of the composition, preferably from about 10 to about 35 weight percent based on the total weight of the composition. The preferred reinforcing fibers are glass, ceramic and carbon and are generally well known in the art, as are their methods of manufacture.

In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about 1/8" to about 1/2" long although roving may also be used. In articles molded from the compositions, the fiber length is typically shorter presumably due to fiber fragmentation during compounding of the composition. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used.

Other preferred sizing-coated glass fibers are commercially available from Owens Corning Fiberglass as, for example, OCF K filament glass fiber 183F Other fillers and reinforcing agents may be used in alone or in combination with reinforcing fibers. These include but are not limited to: carbon fibrils, mica, talc, barite, calcium carbonate, wollastonite, milled glass, flaked glass, ground quartz, silica, zeolites, and solid or hollow glass beads or spheres.

The glass fibers may be blended first with the aromatic polyester and then fed to an extruder and the extrudate cut into pellets, or, in a preferred embodiment, they may be separately fed to the feed hopper of an extruder. In a highly preferred embodiment, the glass fibers may be fed downstream in the extruder to minimize attrition of the glass. Generally, for preparing pellets of the composition set forth herein, the extruder is maintained at a temperature of approximately 480° F. to 550° F. The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

Other Additives

The composition of the present invention may include additional components that do not interfere with the previously mentioned desirable properties but enhance other favorable properties such as antioxidants, colorant, including dyes and pigments, lubricants, mold release materials, nucleants or ultra violet (UV) stabilizers. Examples of lubricants are alkyl esters, for example pentaerythritol tetrastearate, alkyl amides, such as ethylene bis-stearamide, and polyolefins, such as polyethylene.

Also, the final composition may contain polytetrafluoroethylene (PTFE) type resins or copolymers used to reduce dripping in flame retardant thermoplastics.

In one embodiment, the thermoplastic polyester resin molding composition includes a core-shell impact modifier for enhancing heat resistance having a shell derived from an alkylacrylate and a rubbery acrylate core derived from an acrylate having 4 to 12 carbon atoms.

The blends of the invention may be formed into shaped articles by a variety of common processes for shaping molten polymers such as injection molding, compression molding, extrusion and gas assist injection molding. Examples of such articles include electrical connectors, enclosures for electrical equipment, automotive engine parts, lighting sockets and reflectors, electric motor parts, power distribution equipment, communication equipment and the like including devices that have molded in snap fit connectors. The impact modified polyester resins can also be made into film and sheet.

EXAMPLES

The following examples illustrate the present invention, but are not meant to be limitations to the scope thereof. Examples of the invention are designated by numbers, comparative examples are shown by letters. The examples of Table II and III were all prepared and tested in a similar manner:

The ingredients of the examples shown below in Table II and III, were tumble blended and then extruded on a 30 mm Werner Pfleiderer Twin Screw Extruder with a vacuum vented mixing screw, at a barrel and die head temperature between 240 and 265 degrees C. and 300 rpm screw speed. The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Notched Izod (NI) testing as done on 3×½×⅛ inch bars using ASTM method D256. Bars were notched prior to test at various temperature.

Biaxial impact testing, sometimes referred to as instrumented impact testing, was done as per ASTM D3763 using a 4×⅛ inch molded discs. The total energy absorbed by the sample is reported as ft-lbs.

Accelerated weathering test was done as per ASTM-G26. The samples of 2×3×⅛ inch molded rectangular specimen, "color chip", were subjected to light in xenon arc weatherometer equipped with borosilicate inner and outer filters at an irradiance of 0.35 W/m$^2$ at 340 nm, using cycles of 90 min light and 30 min dark with water spray. The humidity and temperature were kept at 60% and 70° C., respectively.

Chip color was measured on a ACS CS-5 ChromoSensor in reflectance mode with a D65 illuminant source, a 10 degree observer, specular component included, CIE color scale as described in "Principles of Color Technology" F. W. Billmeyer and M. Saltzman/John Wiley & Sons, 1966. The instrument was calibrated immediately prior to sample analysis against a standard white tile. The color values reported below are the difference before and after UV exposure. The color change is expressed as delta E. Testing was done as per ASTM D2244.

The impact modifier used was a core-shell acrylic rubber. The impact modifier comprised a butyl acrylate (or derivatives thereof) core grafted to a poly(methyl methacrylate) shell. These pellets were obtained from Rohm and Haas under the trade name PARALOID® as PARALOID® 3330 or EXL3330. EXL3330 is a pelletized form of the powder acrylic rubber EXL3330. The acrylic modifier was made by an emulsion polymerization similar to that described in U.S. Pat. No. 3,808,180. It has an average particle size of about 600 nm.

The core-shell acrylic impact modifiers with polydimethylsiloxane and poly(butyl acrylate) in core was obtained from Mitsubishi Rayon Co. Ltd. under the trade name of Metablend S-2001.

The heat stabilizer was obtained from Ciba Geigy under the trade name IRGAPHOS® as IRGAPHOS® 168, which is a tris di-t-butyl phenyl phosphite.

The heat stabilizer was obtained from Ciba Geigy under the trade name IRGANOX® as IRGANOX® 1010. This antioxidant is a tetra functional 2,6-di-tert butyl hindered phenol.

The heat stabilizer was obtained from Crompton Co under the trade name SEENOX® 412S, which is a tetra ester of pentaerythritol and 3-dodceylthioproprionic acid.

Table I shows the ingredients used in the blends discussed in the comparative examples (designated by letters) and the examples of the invention (designated by numbers).

All examples and comparative examples in Table II and III have 2% titanium dioxide, 0.1%-0.2% mono zinc phosphate, and less than 0.6% of combined heat stabilizers of IRGANOX® 1010, IRGAPHOS® 168, and Seenox 412S.

Examples A-C & 1

The composition of the blends and test results are shown in Table 2. Comparative examples A, B, and C show that a use of MBS induces good notched Izod impact on unweathered samples. However, A, B, and C shows significant loss of impact properties after 1 month (720 hours) as per ASTM G26 accelerated weathering test. Comparative example C shows slightly better weatherability in terms of impact retention and color shift than B and C probably due to the 0.5% UV absorber, UVA5411. However, more significant improvement in the weatherability was achieved in the example 1. Example 1 shows that both good low temperature impact properties and weatherability can be obtained by using PC_ST and EXL3330. Note that the example 1 does not have UV absorber but still has much better weatherability than formulations with MBS.

Examples D-G & 2

Comparative examples F and G illustrate the enhanced weathering properties obtained by using EXL3330 only. However, EXL3330 only did not give good notched Izod impact at −10° C. and −20° C. Comparative examples D and E shows that S-2001 induces slightly better initial notched Izod but causes earlier loss of instrumented impact under UV exposure than EXL3330. Example 2 demonstrates that the combination of PC_ST and S-2001 improves notched Izod impact as well as weatherability of the blend. Note that comparative examples D-G and example 1-2 have lower color shift than comparative examples A-C with MBS after G26 weathering

TABLE I

| Abbreviation | Materials |
| --- | --- |
| MBS | Butadiene-styrene-methyl-methacrylate core-shell rubber impact modifier, EXL3691 from Rohm and Haas Company |
| Lotader | Lotader ® modifier AX8900 from Elf Atochem contains 67% of ethylene, 25% of methyl acrylate, and 8% of glycidyl methacrylate |
| S-2001 | Core-shell type impact modifier with silicone-acrylic-based rubber, METABLEN S-2001 from Mitsubishi Rayon. |
| EXL 3330 | Acrylic impact modifier from Rohm and Haas |
| PC_ST | SiloxanePC Eugenolcapped siloxanecopolycarbonate, 20% polydimethylsiloxane by wt % |
| UVA5411 | 2-(2'HYDROXY-5-T-OCTYLPHENYL)-BENZOTRIAZOLE, UV stabilizer |
| Tinuvin 234 | Benzotriazol UV stabilizer from Ciba-Geigy Company |
| PC | PC bisphenol polycarbonate Lexan ® resin from General Electric Company |
| PBT 315 | Poly(1,4-butylene terephthalate) Mw ~37,000 from GE Plastics |
| Sb$_2$O$_3$ | Antimony trioxide |
| LDPE | Low density polyethylene |
| BC52 | Phenoxy-terminated tetrabromobisphenol-A carbonate oligomer, flame retardant from Great Lakes Chemical Co. |
| ML1624 | Brominated flame-retardant PC from GE plastics. |
| Br-acrylate | Poly(pentabromobezyl acrylate) MW 15,000, 71% Bromine |
| PTFE | Poly(tetrafluoroethylene), anti-dripping agent |
| TiO2 | Titanium Dioxide |

TABLE II

| | Comparative Example A | Comparative Example B | Comparative Example C | Example 1 |
| --- | --- | --- | --- | --- |
| MBS | 8.0 | 9.0 | 10.0 | — |
| Lotader | 2.0 | — | — | — |
| S-2001 | — | — | — | — |
| EXL3330 | — | — | — | 12 |
| PC_ST | — | — | — | 15 |
| UVA5411 | 0.25 | — | 0.5 | — |
| Tinuvin234 | | | | |
| PC | 37.3 | 30.0 | 34.0 | 28.3 |
| PBT | 38.0 | 38.0 | 35.0 | 34.0 |
| Br-acrylate | 10.9 | | | |
| ML1624 | | 20.0 | 15.4 | |
| BC52 | | | | 8.1 |
| Sb2O3 | 3.5 | 3.0 | 3.1 | 2.4 |
| LDPE | | | 2.0 | |

TABLE II-continued

|  | Comparative Example A | Comparative Example B | Comparative Example C | Example 1 |
|---|---|---|---|---|
| PTFE | 0.07 | — | — | 0.2 |
| TiO2 | 2.0 | 2.0 | 2.0 | 2.0 |
| Initial notched Izod impact (ft-lb/in) | | | | |
| at 0 degree C. | 14.5(100%) | 13.9(100%) | 13.3(100%) | 15.1(100%) |
| at 0 degree C. | — | 12.1(100%) | 11.6(100%) | 14.0(100%) |
| at −10 degree C. | 12.0(100%) | 11.7(100%) | 11.2(100%) | 12.3(100%) |
| at −20 degree C. | 12.0(20%) | 9.6(80%) | 10.4(100%) | 11.5(100%) |
| Instrumented impact at −20 degree C. after ASTM G26 weathering (ft-lb) | | | | |
| 0 hrs, G26 | 25.2(100%) | 26.4(100%) | 26.8(100%) | 28.2(100%) |
| 720 hrs, G26 | 1.3(0%) | 2.1(0%) | 6.5(0%) | 23.4(100%) |
| 1440 hrs, G26 | 1.2(0%) | 2.2(0%) | — | 17.8(100%) |
| Notched Izod impact at RT after ASTM G26 weathering (ft-lb/in) | | | | |
| 0 hrs, G26 | 12.9 | 11.1 | — | 15.2 |
| 720 hrs, G26 | 11.5 | 8.6 | — | 14.4 |
| 1440 hrs, G26 | 10.6 | 8.1 | — | 13.6 |
| 2880 hrs, G26 | 5.4 | 5.5 | — | 13.1 |
| Color shift (delta E) after ASTM G26 weathering | | | | |
| 720 hrs, G26 | 11.4 | 8.1 | 5.9 | 5.0 |
| 1440 hrs, G26 | 13.7 | 9.8 | — | 4.3 |

Examples H-J

The formulations and results for Comparative examples H-J are summarized in Table IV. These formulations contain no TiO2.

TABLE IV

|  | Comparative Example H | Comparative Example I | Comparative Example J |
|---|---|---|---|
| MBS | — | — | — |
| Lotader | — | — | — |
| S-2001 | — | — | — |
| EXL3330 | 9.2 | 9.2 | 11.7 |
| PC_ST | 10.6 | 10.6 | 14.6 |
| UVA5411 | | 0.5 | — |
| Tinuvin234 | | | |
| PC | 31.3 | 31.3 | 26.1 |
| PBT | 38.0 | 37.5 | 37.3 |
| Br-acrylate | 8.0 | 8.0 | 7.9 |
| ML1624 | 2.9 | 2.9 | 2.4 |
| BC52 | | | |
| Sb2O3 | | | |
| LDPE | 0.0 | 0.0 | 0.0 |
| PTFE | | | |
| TiO2 | | | |
| Initial notched Izod impact (ft-lb/in) | | | |
| at 23 degree C. | 16.2(100%) | 156.2(100%) | 16.0(100%) |

TABLE III

|  | Comparative Example D | Comparative Example E | Comparative Example F | Comparative Example G | Example 2 |
|---|---|---|---|---|---|
| MBS | — | — | — | — | — |
| Lotader | — | — | — | — | — |
| S2001 | 8 | 12 | — | — | 9.2 |
| EXL3330 | — | — | 8 | 12 | — |
| PC ST | — | — | — | — | 10.6 |
| UVA5411 | 0.25 | | 0.25 | 0.5 | 0.5 |
| Tinuvin234 | | 0.5 | | | |
| PC | 41.3 | 36.6 | 42.4 | 36.7 | 32.8 |
| PBT | 37.0 | 38.0 | 37.0 | 37.0 | 35.8 |
| BC52 | 10.0 | 9.6 | 9.0 | 10.3 | 8.0 |
| Sb2O3 | 3.1 | 2.9 | 2.7 | 3.1 | 2.9 |
| LDPE | | | | | |
| PTFE | 0.4 | 0.4 | 0.6 | 0.4 | 0.2 |
| TiO2 | 2.0 | 2.0 | 2.0 | 2.0 | 2.0 |
| Initial notched Izod impact (ft-lb/in) | | | | | |
| at 0 degree C. | 15.5(100%) | 15.5(100%) | 16.3(100%) | 16.6(100%) | 15.0(100%) |
| at 0 degree C. | 11.2(80%) | 13.2(100%) | 6.2(20%) | 13.8(100%) | 13.7(100%) |
| at −10 degree C. | 5.0(0%) | 8.1(60%) | 4.0(0%) | 4.7(0%) | 12.8(100%) |
| at −20 degree C. | 4.1(0%) | 4.5(0%) | 3.6(0%) | 4.0(0%) | 6.9(20%) |
| Instrumented impact at −20 degree C. after ASTM G26 weathering (ft-lb) | | | | | |
| 0 hrs, G26 | 31.9(100%) | 33.4(100%) | 31.8(100%) | 30.1(100%) | 32.2(100%) |
| 720 hrs, G26 | 30.4(100%) | 29.2(100%) | 32.5(100%) | 25.7(100%) | 28.0(100%) |
| 1440 hrs, G26 | 1.6(0%) | 0.9(0%) | 15(50%) | 29.9(100%) | 26.6(100%) |
| Notched Izod impact at RT after ASTM G26 weathering (ft-lb/in) | | | | | |
| 0 hrs, G26 | 15.5 | 15.5 | 16.2 | 16.6 | 15.1 |
| 720 hrs, G26 | | 14.7 | | | 14.6 |
| 1440 hrs, G26 | 14.3 | 14.0 | 14.1 | 14.5 | 14.2 |
| 2160 hrs, G26 | | 13.6 | | | 14.1 |
| 2880 hrs, G26 | 13.5 | | 13.3 | 14.0 | — |
| Color shift (delta E) after ASTM G26 weathering | | | | | |
| 720 hrs, G26 | 4.4 | 4.6 | 4.3 | 4.3 | 4.7 |
| 1440 hrs, G26 | 3.5 | 4.2 | 3.9 | 3.9 | 3.8 |

TABLE IV-continued

|  | Comparative Example H | Comparative Example I | Comparative Example J |
|---|---|---|---|
| at 0 degree C. | 14(100%) | 15(100%) | 14.9(100%) |
| at −10 degree C. |  |  | 13.9(100%) |
| at −20 degree C. | 5.5(0%) | 4.6(0%) | 10.4(80%) |
| Instrumented impact at −20 degree C. after ASTM G26 weathering (ft-lb) | | | |
| 0 hrs, G26 | 28(100%) | 27.3(100%) | 27.9(100%) |
| 720 hrs, G26 | 7.3(0%) | 26.7(34%) | 5.6(0%) |
| 1440 hrs, G26 | 1.3(0%) | 7.7(0%) | 4.0(0%) |
| Notched Izod impact at RT after ASTM G26 weathering (ft-lb/in) | | | |
| 0 hrs, G26 | — | — | 16.0 |
| 720 hrs, G26 | — | — | 13.921 |
| 1440 hrs, G26 | — | — | 13.894 |
| 2880 hrs, G26 | — | — | 11.888 |
| Color shift (delta E) after ASTM G26 weathering | | | |
| 720 hrs, G26 | 15.6 | 8.0 | 15.4 |
| 1440 hrs, G26 | 19.1 | 9.8 | 18.9 |

As can be seen, these compositions which include no TiO2 have significant loss of impact strength as a result of weathering.

Examples 3-5

Table V shows formulations and results for three additional examples in accordance with the invention.

TABLE V

|  | Example 3 | Example 4 | Example 5 |
|---|---|---|---|
| MBS | — | — | — |
| Lotader | — | — | — |
| S-2001 | — | — | — |
| EXL3330 | 11.7 | 8.9 | 7.7 |
| PC_ST | 14.6 | 10.3 | 9.7 |
| UVA5411 |  | 0.5 | 0.5 |
| Tinuvin 234 |  |  |  |
| PC | 36.1 | 29.2 | 29.6 |
| PBT | 35.4 | 37.2 | 37.5 |
| Br-acrylate |  |  |  |
| ML1624 |  |  |  |
| BC52 | 7.9 | 7.7 | 10.0 |
| Sb2O3 | 2.4 | 2.4 | 3.1 |
| LDPE | 0.0 | 1.9 |  |
| PTFE | — | — | — |
| TiO2 | 1.9 | 1.9 | 1.9 |
| Initial notched Izod impact (ft-lb/in) | | | |
| at 23 degree C. | 15.1(100%) | 15.6(100%) | 16.0(100%) |
| at 0 degree C. | 14.0(100%) | 13.3(100%) | 11.3(100%) |
| at −10 degree C. | 12.3(100%) | 9.7(80%) | 4.5(0%) |
| at −20 degree C. | 10.4(80%) | 4.7(0%) | 4.2(0%) |
| Instrumented impact at −20 degree C. after ASTM G26 weathering (ft-lb) | | | |
| 0 hrs, G26 | 28.2(100%) | 29.5(100%) | 29.5(100%) |
| 720 hrs, G26 | 23.4(100%) | 26.2(100%) | 25.4(100%) |
| 1440 hrs, G26 | 17.8(100%) | 27.0(100%) | 29.4(100%) |
| 2160 hrs, G26 |  |  | 26.4(100%) |
| Notched Izod impact at RT after ASTM G26 weathering (ft-lb/in) | | | |
| 0 hrs, G26 | 15.2 | 15.6 | 16.1 |
| 720 hrs, G26 | 14.4 | 14.7 | — |
| 1440 hrs, G26 | 13.6 | 13.6 | 12.9 |
| 2180 hrs, G26 |  | 14.5 | — |
| 2880 hrs, G26 | 13.1 | — | 13.2 |
| Color shift (delta E) after ASTM G26 weathering | | | |
| 720 hrs, G26 | 15.6 | 4.6 | 4.2 |
| 1440 hrs, G26 | 19.1 | 3.9 | 3.9 |

Example 3 is identical to Comparative Example J, except that 1.9% TiO2 is present in place of a portion of the polyester. The comparison clearly shows that the presence of the TiO2, the polycarbonate, polyester and PC-siloxane block copolymer are all necessary to achieve the desired weatherability.

Examples K-L & 6

Table VI shows the comparison of acrylic impact modifier and Lotader. U.S. Pat. No. 5,981,661 described that the combination of organopolysiloxane-polycarbonate block copolymer (PCST) and a glycidyl ester impact modifier induces good impact and weatherability. However, comparative example L with organopolysiloxane-polycarbonate block copolymer and a glycidyl ester impact modifier (Lotader) shows inferior surface gloss and lower UL94 flame resistance as compared to the example 6 with acrylic impact modifier and organopolysiloxane-polycarbonate block copolymer. Note that Example 6 has surface gloss and UL94 flame property comparable to comparable example K that has no impact modifier.

TABLE VI

|  | Comparative Example K | Comparative Example L | Example 6 |
|---|---|---|---|
| PC | 47.1 | 17.1 | 17.1 |
| Lotader |  | 10.0 |  |
| EXL3330 |  |  | 10.0 |
| PCST |  | 20.0 | 20.0 |
| PBT315 | 35.0 | 35.0 | 35.0 |
| BC52 concentrate* | 15.0 | 15.0 | 15.0 |
| UVA5411 | 0.5 | 0.5 | 0.5 |
| TSAN | 0.2 | 0.2 | 0.2 |
| MZP | 0.2 | 0.2 | 0.2 |
| TiO2 | 2.0 | 2.0 | 2.0 |
| Properties | | | |
| MVR** | 31 | 18 | 24 |
| Gloss measured at 20 degree angle | 91 | 22 | 91 |
| Gloss measured at 60 degree angle | 102 | 66 | 99 |
| U UL94-V0, total flame-out-time for 5 bars with 1.5 mm thickness (seconds) | 14 | 30 | 16 |
| IZOD-Notched at 23° C. (ft-lb/in) | 1.2 | 14.9 | 12.5 |
| Flexural Modulus (psi) | 416546 | 293179 | 317852 |
| Flexural Stress at Yield (psi) | 15820 | 10798 | 11263 |
| Tensile Modulus (psi) | 426705 | 294630 | 303338 |
| Tensile Stress at Yield (psi) | 10058 | 7489 | 7112 |
| Tensile Stress at break (psi) | 51 | 44 | 40 |
| Tensile Elongation at break (%) | 90 | 98 | 46 |

*BC52 concentrate: 65% BC52, 21% Sb2O3, 13.5% PBT, 0.5% PTFE
**MVR: melt volume rate at 265 deg C. with 5 kg load and 360 seconds dwelling time
***gloss values were average gloss of 10 disks.

Examples M-O & 7

Acrylic impact modifiers are used to improve impact properties of polyester or polyester blend as taught in U.S. Pat. No. 4,264,487. Comparative example M and N shows that notched Izod and instrumented impact properties at room temperatures are good and ductile. However, even at 30% loading of acrylic impact modifier in comparative N, parts per notched Izod and instrumented impact tests show brittle behavior with 0% ductility. In addition, higher loading of acryic impact modifier in comparative example N reduces flame resistance substantially as shown in UL94 flame test. Example 7 with acrylic impact modifier and PCST shows superior properties in low temperature impact and flame properties as compared to comparative examples M-O. Hence table VII demonstrates that the present invention with the combination of acrylic impact modifier and organopolysiloxane-polycarbonate block copolymer has better performance than impact modified polyester compositions shown in prior art in U.S. Pat. No. 4,264,487 and U.S. Pat. No. 5,981,661.

TABLE VII

|  | Comparative Example M | Comparative Example N | Comparative Example O | Example 7 |
|---|---|---|---|---|
| PC | 48.1 | 28.1 | 28.1 | 18.1 |
| Lotader |  |  | 10 |  |
| EXL3330 | 10 | 30 |  | 10 |
| PCST |  |  | 30 | 30 |
| PBT315 | 25 | 25 | 25 | 25 |
| BC52 concentrate | 15 | 15 | 15 | 15 |
| UVA5411 | 0.5 | 0.5 | 0.5 | 0.5 |
| TSAN | 0.2 | 0.2 | 0.2 | 0.2 |
| MZP | 0.2 | 0.2 | 0.2 | 0.2 |
| TiO2 | 1.0 | 1.0 | 1.0 | 1.0 |
| Properties |  |  |  |  |
| MVR | 17.8 | 10.5 | 13.3 | 15 |
| UL94-V0, total flame-out-time for 5 bars with 1.5 mm thickness (seconds) | 16 | 257 | 30 | 18 |
| HDT at 1.85 Mpa (° C.) | 90.5 | 75.9 | 83.9 | 86.2 |
| HDT at 0.45 Mpa (° C.) | 117 | 112 | 116 | 116 |
| Notched Izod at RT | 13.9 (100%) | 13.1 (100%) | 14.0 (100%) | 13.7 (100%) |
| Notched Izod at −10 | 3.9 (0%) | 4.8 (0%) | 11.4 (100%) | 11.0 (100%) |
| Notched Izod at −20 | 3.3 (0%) | 4.1 (0%) | 6.0 (0%) | 9.6 (100%) |
| Instrumented impact at RT | 37 (100%) | 35 (100%) | 36 (100%) | 44 (100%) |
| Instrumented impact at −20 C. | 18 (0%) | 45 (0%) | 44 (100%) | 45 (100%) |
| Instrumented impact at −40 C. | 9 (0%) | 33 (0%) | 39 (0%) | 47 (40%) |
| Tensile Modulus (psi) | 332318 | 240894 | 222029 | 300392 |
| Tensile Strength (psi) | 6385 | 5224 | 6066 | 5964 |
| Tensile Elongation (%) | 20 | 74 | 110 | 99 |

*BC52 concentrate: 65% BC52, 21% Sb2O3, 13.5% PBT, 0.5% PTFE
**MVR: melt volume rate at 265 deg C. with 5 kg load and 360 seconds dwelling time

The invention claimed is:

1. A composition comprising (a) a polyester and polycarbonate blend; (b) an organopolysiloxane-polycarbonate block copolymer; (c) an acrylic core shell impact modifier; (d) titanium dioxide and (e) a flame retarding amount of a halogenated flame retardant.

2. A composition according to claim 1 wherein the acrylic core shell impact modifier has a particle size of from 300 to 800 nm.

3. A composition according to claim 1 wherein said acrylic core shell impact modifier comprises a multi-phase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight cross linking member, 0.1 to 5% by weight graft linking monomer, said cross linking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

4. A composition according to claim 1 wherein said acrylic core shell impact modifier comprises a multi-phase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight cross linking member, 0.1 to 5% by weight graft linking monomer, said cross linking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

5. A composition according to claim 1 wherein said acrylic core shell impact modifier comprises a multi-phase composite interpolymer comprising about 25 to 95 weight percent of a first elastomeric phase polymerized from a monomer system comprising about 5-50% polydimethylsiloxane, 30 to 99.8% by weight $C_1$ to $C_{14}$ alkyl acrylate, 0.1 to 5% by weight cross linking member, 0.1 to 5% by weight graft linking monomer, said cross linking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

6. A composition according to claim 1 wherein said organopolysiloxane-polycarbonate copolymer comprises organopolysiloxane blocks having repeating units of the general formula:

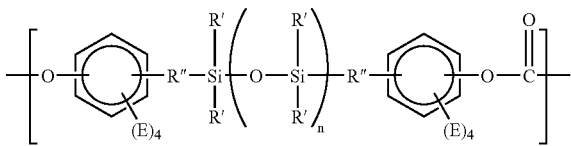

wherein R' is a member selected from the class of monovalent hydrocarbon radicals, halogenated monovalent hydrocarbon radicals and cyanoalkyl radicals; E is independently selected from the group consisting of hydrogen, lower alkyl, alkoxy radicals, aryl, and alkylaryl, halogen radicals and mixtures thereof, and R" is a divalent hydrocarbon radical, and n is from about 10 to about 120.

7. A composition according to claim 2 wherein said organopolysiloxane-polycarbonate copolymer comprises polycarbonate blocks having repeating units of the general formulae:

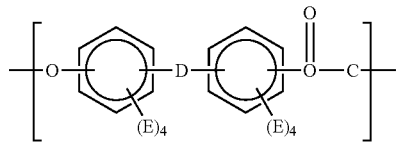

wherein E is independently selected from the group consisting of hydrogen, lower alkyl, alkoxy radicals, aryl, and alkylaryl, halogen radicals and mixtures thereof, and D is a divalent hydrocarbon radical containing from 1-15 carbon atoms; —S—, —SO—, —S(O)$_2$; and —O—.

8. A composition according to claim 3 wherein said organopolysiloxane-polycarbonate copolymer comprises polycarbonate blocks having repeating units of the general formulae:

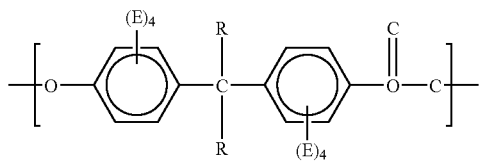

wherein E is independently selected from the group consisting of hydrogen, lower alkyl, alkoxy radicals, aryl, and alkylaryl, halogen radicals and mixtures thereof, and R is selected from the group consisting of hydrogen, cycloaliphatic, aryl, monovalent hydrocarbon radicals, aryl or alkyaryl.

9. A composition according to claim 1 wherein said organopolysiloxane-polycarbonate copolymer comprises organopolysiloxane blocks having repeating units of the general formulae:

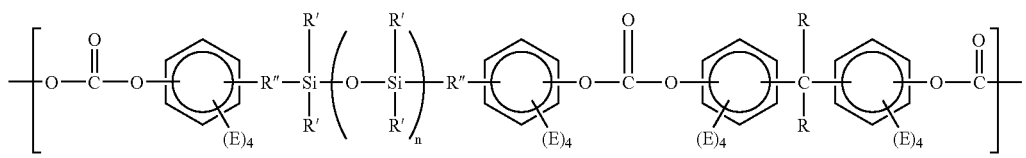

R' is a member selected from the class of monovalent hydrocarbon radicals, halogenated monovalent hydrocarbon radicals and cyanoalkyl radicals; E is a member independently selected from the class of hydrogen, lower alkyl, alkoxy radicals, aryl, and alkylaryl, halogen radicals and mixtures thereof; R" is a divalent hydrocarbon radical; n is from about 10 to about 120; R is a member selected from the class of hydrogen, cycloaliphatic, aryl, monovalent hydrocarbon radicals and alkylaryl.

10. A composition according to claim 5 wherein E is independently selected from the group consisting of hydrogen, alkyl of 1 to 6 carbon atoms, and halogen.

11. A composition according to claim 1 wherein said polyester is derived from an aliphatic diol and an aromatic dicarboxylic acid having repeating units of the following general formula:

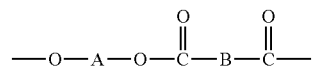

wherein each A is independently a divalent aliphatic, salicylic or aromatic hydrocarbon or polyoxyalkylene radical, or mixtures thereof and each B is independently a divalent aliphatic, salicylic or aromatic radical, or mixtures thereof.

12. A composition according to claim 1 wherein comprises an aromatic polycarbonate resin comprises one or more resins selected from linear aromatic polycarbonate resins, branched aromatic polycarbonate resins and poly(ester-carbonate) resins.

13. A composition according to claim 1 wherein said polycarbonate comprises a linear aromatic polycarbonate resin.

14. A composition according to claim 1 wherein said polycarbonate comprises a poly (ester carbonate).

15. A composition according to claim 1, comprising 10-60% polycarbonate, 25 to 50% polyester, 5 to 15% acrylic core shell impact modifier, 5-50% organopolysiloxane-polycarbonate block copolymer, 5-20% flame retardant and 0.1 to 10% titanium dioxide each based on 100 parts by weight of the composition.

16. A composition according to claim 1 wherein the resin comprises from 15 to 55 parts by weight, of the polycarbonate resin; from 25 to 55 parts by weight of the polyester resin; from 20 to 35 parts by weight of the organopolysiloxane-polycarbonate block copolymer; and from 5 to 15 parts by weight of the acrylic impact modifier, and 0.1 to 10% titanium dioxide each based on 100 parts by weight of the composition.

17. A composition according to claim 1 wherein said flame retardant is a halogenated epoxy, poly (haloarylmethacrylate), halogenated polystyrene or a poly (haloarylacrylate) flame retardant.

18. A composition according to claim 1 wherein said flame retardant is a polybromobenzylacrylate flame retardant.

19. A composition according to claim 1, comprising 25-60% polycarbonate, 25 to 50% polyester, 5 to 15% acrylic core shell impact modifier, 5-20% organopolysiloxane-polycarbonate block copolymer, 5-20% flame retardant and 0.1 to 10% titanium dioxide each based on 100 parts by weight of the composition.

20. An article molded from the composition of claim 1.

21. A molded article according to claim 20 comprising an injection molded article.

22. A molded article according to claim 20, comprising an enclosure for an electrical communication device.

23. A molded article according to claim 20 comprising a cable connector, telephone, computer, video, and network interface devices for residential, commercial or industrial use.

* * * * *